United States Patent
Vaage

[11] 3,952,382
[45] Apr. 27, 1976

[54] RAPID RELEASE HOOK
[75] Inventor: Einar Vaage, Vestfossen, Norway
[73] Assignee: Einar Vaage, Vestfossen, Norway
[22] Filed: July 22, 1974
[21] Appl. No.: 490,283

[52] U.S. Cl. .................. 24/241 PS; 24/230 AT; 24/234
[51] Int. Cl.² .......................... A44B 13/02
[58] Field of Search ............. 24/230 AT, 230.5 AD, 24/230.5 AC, 230.5 S, 230.5 T, 241 SL, 241 PC, 241 TC, 265 CD, 248 SP, 230 F, 230 AS, 58, 232, 233, 234, 241 PS

[56] References Cited
UNITED STATES PATENTS

| 1,299,821 | 4/1919 | Carpmill et al. ............. 24/241 SL |
| 2,992,594 | 7/1961 | Anderson et al. ............. 24/230 AT |

FOREIGN PATENTS OR APPLICATIONS

| 237,461 | 4/1945 | Switzerland .................. 24/241 SL |
| 217,028 | 9/1941 | Switzerland .................. 24/241 SL |

Primary Examiner—Paul R. Gilliam
Assistant Examiner—David H. Corbin
Attorney, Agent, or Firm—Pennie & Edmonds

[57] ABSTRACT

A rapid-release hook which can be released manually by gripping a sleeve and exerting a pull on the sleeve whereby two bail members held together by the sleeve is released. The sleeve is spring loaded to automatic positioning in locked position.

2 Claims, 4 Drawing Figures

U.S. Patent    April 27, 1976    3,952,382
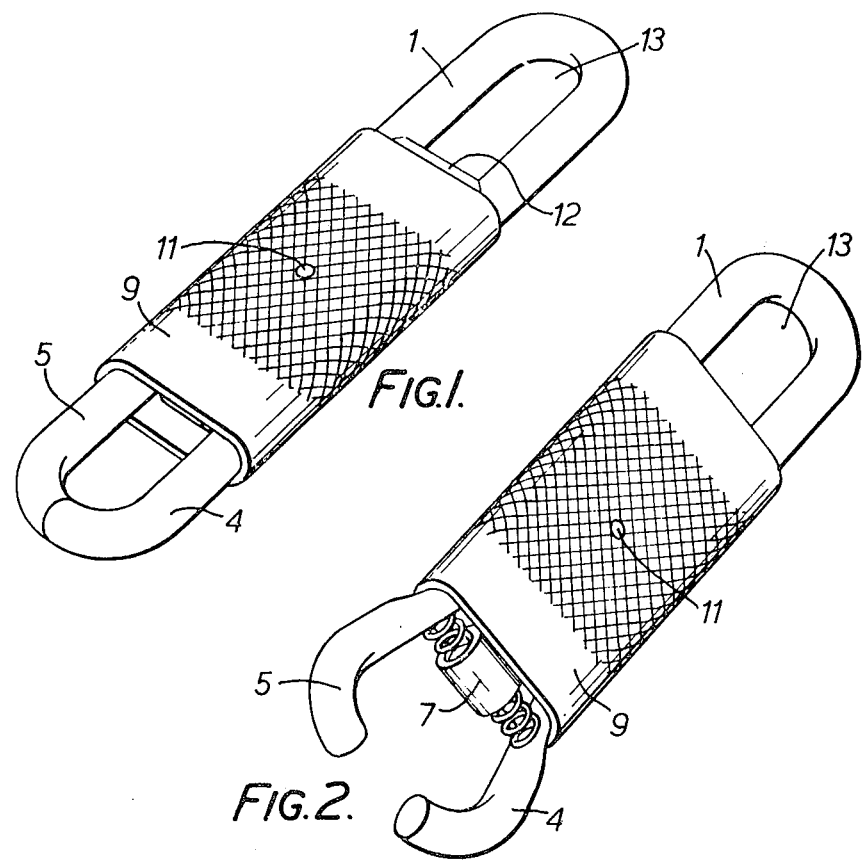
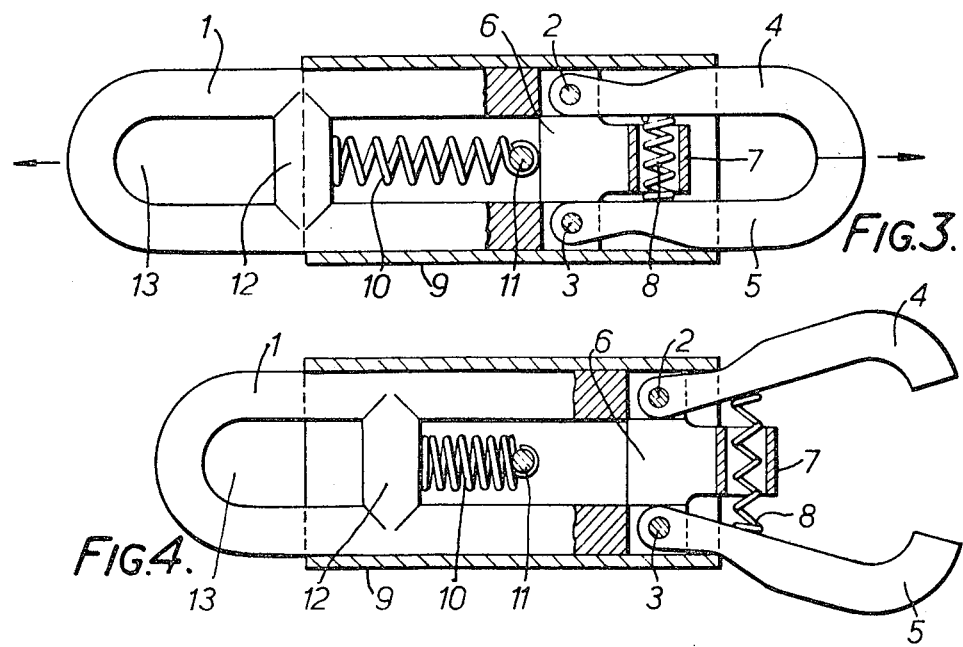

RAPID RELEASE HOOK

The invention relates to a rapid-release hook, i.e. a locking element which permits rapid-release whenever necessary. Such rapid-release hooks are used, for example, for tethering horses in training apparatus, mounting climbing, cargo-lifting equipment etc., in other words practically in all fields where rapid release of a connection is necessary. The known types are effected as snap locks or in other ways, and common to the known types is the fact that unlocking or release under load is difficult and sometimes impossible. Some of the known types have also been known to fail, i.e. to open unintentionally.

The invention is based on the type of rapid-release hooks where bail members are held together by a sleeve pushed on to the bail members and released by displacement of the sleeve.

On the basis of such a known hook, the hook according to the invention is characterized in that the sleeve is springloaded to provide automatic positioning in locked position. It being thereby ensured that the sleeve is at all times in locking position until deliberately actuated to the contrary, that is to say displaced to release the bail members. When the rapid-release hook is under tension, i.e. load, it is sufficient as a rule merely to grip the sleeve and hold it, the hook being then released under the load.

The hook consists of a U-shaped member on whose legs respective bail members are pivotally mounted, the said bail members in interlocked position completing the U-member to form an elongated oval link. The rapid-release hook has thereby the form of an elongated oval link with the sleeve disposed thereupon and is readily used in cables, chains and the like.

It is advantageous that the bail members are springloaded to automatically open when the sleeve is displaced and the bail members are released. A secure release is thereby ensured also when the hook is not under load of a type such that the element connected to the hook is pulled out of connection as soon as it is released.

Between the leg ends of the U-member a bridge is provided which reinforces the U-member and also serves as guide for a spring biased between the two bail members.

Between the legs of the U-member, a bridge defining an eye in the hook can be arranged in the end facing away from the end wherein the bail members are arranged; the said bridge also forms an abutment for the sleeve spring.

The invention is further described hereinbelow with reference to the drawings, which illustrate a preferred embodiment example.

FIG. 1 is a perspective drawing of a rapid-release release hook in closed condition, FIG. 2 illustrates the hook in open condition, FIG. 3 is a section through the hook in closed condition, and FIG. 4 is a section through the hook in open condition.

The rapid-release hook illustrated on the Figures is substantially in the form of an elongated oval link with sleeve disposed thereupon. The hook is constructed from a U-shaped member 1 on the legs of which respective bail members 4, 5 are mounted by means of lugs 2, 3. The said bail members complete the U-member so that, together, they form an elongate oval link.

Between the leg ends of the U-member a bridge element 6 is provided which stiffens the ends of the legs relatively and, on the outside, is formed as a sleeve 7 which forms a guide for a spring 8 biased between the bail member 4 and 5.

A sleeve 9 is disposed over the elongated oval link and is held in position over the joined bail member 4, 5 so that they are interlocked. The sleeve 9 is maintained in this locking position under the action of a spring 10 biased between a rivet 11 inserted in the sleeve 9, and a bridge element 12 between the legs of the U-portion. The bridge element 12 simultaneously defines an eye 13.

When the hook is to be released, the sleeve 9 is simply displaced in direction away from the bail members, to the position illustrated in FIGS. 2 and 4, whereby the bail members 4, 5 are released and open under the action of the spring 8. If the rapid-release hook is under load, as indicated by the arrows in FIG. 3, it is sufficient to grip the sleeve 9 manually and the release takes place automatically if there is a suspended load to the right-hand side of FIG. 3. In the opposite case, a light displacement force can be exerted on the sleeve 9 in direction away from the bail members, and the hook will then be released. The sleeve 9 is advantageously provided, as illustrated in FIGS. 1 and 2, with a serrated ring on the surface to facilitate actuation.

Having described my invention, I claim:

1. A rapid-release hook comprising a U-shaped member having two substantially parallel legs, a pair of cooperating bail members, one of said bail members being pivoted to the outer end of one of the legs of said U-shaped member, the other of said pair of bail members being pivoted to the outer end of the other leg of said U-shaped member, each of said bail members being pivotable between an open and a closed position, said bail members when in the closed position defining a second U-shaped member of substantially the same thickness and of substantially the same lateral dimension as said first U-shaped member and defining therewith a flat oval link, a sleeve, said sleeve slidingly embracing said flat oval link, one end of said sleeve extending about the opening in said second U-shaped member when said bail members are closed to form said second U-shaped member, said sleeve being slideable longitudinally of said oval link from a first position to a second position to open and close said bail members, a spring between said bail members urging said bail members to the open position, a bridge between the legs of said first U-shaped member, a second spring being secured at one end to, within and laterally confined by said sleeve and bearing at its other end against said bridge to urge said sleeve towards said second position to close said bail members, and in the closed position of said bail members said sleeve comprising the largest lateral dimension of said rapid-release hook.

2. The rapid-release hook of claim 1 including a second bridge adjacent the termini of the legs of said first U-shaped member, a guide sleeve secured to said second bridge, and said guide sleeve enclosing and guiding said first named spring.

* * * * *